(12) United States Patent
Demaj et al.

(10) Patent No.: US 11,645,519 B2
(45) Date of Patent: May 9, 2023

(54) FILTERING DATA IN ORTHOGONAL DIRECTIONS THROUGH A CONVOLUTIONAL NEURAL NETWORK

(71) Applicant: STMicroelectronics (Rousset) SAS, Rousset (FR)

(72) Inventors: Pierre Demaj, Nice (FR); Laurent Folliot, Gourdon (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 807 days.

(21) Appl. No.: 16/691,914

(22) Filed: Nov. 22, 2019

(65) Prior Publication Data
US 2020/0184331 A1 Jun. 11, 2020

(30) Foreign Application Priority Data
Dec. 5, 2018 (FR) ...................................... 1872330

(51) Int. Cl.
*G06N 3/04* (2023.01)
*G06N 3/08* (2023.01)
*G06N 20/00* (2019.01)
*G06F 17/16* (2006.01)
*G06N 3/02* (2006.01)
(Continued)

(52) U.S. Cl.
CPC ............... *G06N 3/08* (2013.01); *G06F 17/16* (2013.01); *G06N 3/02* (2013.01); *G06N 3/045* (2023.01); *G06N 3/0464* (2023.01); *G06N 3/063* (2013.01); *G06N 20/00* (2019.01)

(58) Field of Classification Search
CPC ........ G06N 3/02; G06N 3/0454; G06N 3/045; G06N 3/0464
See application file for complete search history.

(56) References Cited

U.S. PATENT DOCUMENTS

2018/0232629 A1\* 8/2018 Du ........................ G06N 3/0454
2019/0304057 A1\* 10/2019 Cai ....................... G06V 10/462
(Continued)

FOREIGN PATENT DOCUMENTS

CN 106779060 A 5/2017
CN 106875011 A 6/2017
(Continued)

OTHER PUBLICATIONS

Ma, Yufei, et al. "Optimizing the convolution operation to accelerate deep neural networks on FPGA." IEEE Transactions on Very Large Scale Integration (VLSI) Systems 26.7 (2018): 1354-1367. (Year: 2018).\*
(Continued)

*Primary Examiner* — Hal Schnee
(74) *Attorney, Agent, or Firm* — Slater Matsil, LLP

(57) ABSTRACT

A method can be used to process an initial set of data through a convolutional neural network that includes a convolution layer followed by a pooling layer. The initial set is stored in an initial memory along first and second orthogonal directions. The method includes performing a first filtering of the initial set of data by the convolution layer using a first sliding window along the first direction. Each slide of the first window produces a first set of data. The method also includes performing a second filtering of the first sets of data by the pooling layer using a second sliding window along the second direction.

22 Claims, 6 Drawing Sheets

(51) Int. Cl.
    *G06N 3/063*     (2023.01)
    *G06N 3/045*     (2023.01)
    *G06N 3/0464*     (2023.01)

(56) References Cited

U.S. PATENT DOCUMENTS

| | | | |
|---|---|---|---|
| 2020/0090046 A1* | 3/2020 | Sozubek | G06N 3/084 |
| 2020/0134435 A1* | 4/2020 | Gu | G06N 3/0454 |
| 2021/0073569 A1* | 3/2021 | Gao | G06T 7/12 |
| 2021/0192246 A1* | 6/2021 | Yang | G06V 10/94 |

FOREIGN PATENT DOCUMENTS

| | | |
|---|---|---|
| CN | 108038107 A | 5/2018 |
| WO | 2018200076 A1 | 11/2018 |

OTHER PUBLICATIONS

Chang, Jing, et al., "An efficient implementation of 2D convolution in CNN", IEICE Electronics Express, vol. 14, No. 1, published Dec. 16, 2016, pp. 1-8.

* cited by examiner

FILTERING DATA IN ORTHOGONAL DIRECTIONS THROUGH A CONVOLUTIONAL NEURAL NETWORK

CROSS-REFERENCE TO RELATED APPLICATIONS

This application claims priority to French Patent Application No. 1872330, filed on Dec. 5, 2018, which application is hereby incorporated herein by reference.

TECHNICAL FIELD

Embodiments relate to a method and device for processing data through a neural network.

BACKGROUND

Massive use is made of neural networks to solve diverse statistical problems notably the problem of data classification.

After an automatic learning phase, generally supervised, that is to say on an already classified reference database, a neural network "learns" and becomes capable on its own of applying the same classification to unknown data.

Convolutional neural networks, or CNNs, are a type of neural network in which the connection pattern between the neurons is inspired by the visual cortex of animals. They allow effective recognition of objects or people in images or videos.

A convolutional neural network generally contains four types of layers successively processing the information: the convolution layer which processes, for example, blocks of the image one after another; the non-linear layer which makes it possible to improve the relevance of the result; the pooling layer which makes it possible to group together several neurons into a single neuron; and the fully-connected layer (or dense layer) which links all the neurons of a layer to all the neurons of the previous layer.

Each layer takes data as input and delivers output data ("features") as output after processing by the layer.

The convolution layer generally corresponds to a set of scalar products between the outputs of the previous layer and the weights of the layer. It generally constitutes the first layer of a convolutional neural network.

By "weight", which is a term whose meaning in the field of neural networks is well known to the person skilled in the art, is meant parameters of neurons that can be configured to obtain good output data.

The aim of the convolution layer is to tag the presence of a set of specific data in the images received as input. Accordingly, a convolution filtering is carried out. The principle is to slide a window representing the data to be detected, and to compute the convolution product between the window and each portion of the scanned image.

The filtering window is known by the person skilled in the art by the term "convolution kernel" and in the form of matrix, for example, a kernel of 3×3 weight.

Output data indicating where the specific data are situated on the image are obtained for each convolution product.

The pooling layer is often placed between two convolution layers. It receives as input the output data of the convolution layer to which a "pooling" operation is applied, which consists in reducing the size of the data while preserving their important characteristics. It makes it possible to reduce the number of parameters and of computations in the network. The effectiveness of the network is consequently improved.

The most common form is a layer for pooling with filtering windows in matrix form, for example, a 2×2 matrix.

The fully-connected layer constitutes the last layer of a convolutional or non-convolutional neural network. It makes it possible to classify the input data of the neural network.

The typical architectures of neural networks stack a few pairs of convolution layers and non-linear layers and then add a pooling layer and repeat this scheme until output data of sufficiently small size are obtained, and then end with one or more fully-connected layers.

Today, neural networks are ever more complex and require large computational power.

The instruction per second is a unit of measurement of the performance of a system, for example, a microprocessor. The more complex the configuration of the neural network, the more the number of instructions executed by the system per second decreases.

SUMMARY

Modes of implementation and embodiments of the invention relate to deep learning, notably deep neural networks, and more particularly the reduction of the computational load of a computation unit, for example, a microprocessor, processing an initial set of data through a convolutional neural network.

Embodiments of the invention can reduce the computational load, for example, of a microprocessor processing the data received or created by a convolutional neural network.

According to one aspect, there is proposed a method for reducing the computational load of a computation unit, for example, a microprocessor, processing an initial set of data through a convolutional neural network. The initial set is stored in an initial memory along first and second orthogonal directions. The network comprises at least one convolution layer followed by at least one pooling layer. The processing comprises a first filtering of the initial set of data by the at least one convolution layer using a first sliding window along the first direction, each slide of the first window producing a first set of data, and a second filtering of the first sets of data by the at least one pooling layer using a second sliding window along the second direction.

The combination of these two filterings contributes to reducing the computational load of the computation unit.

"By initial memory" is meant, for example, a volatile memory, for example, a RAM memory (for "Random Access Memory").

The first filtering window is here a window carrying out a convolution filtering. The first filtering window is characteristic of the convolution layer.

The second filtering window makes it possible to apply the "pooling" operation on the output data obtained by the first filtering window. The second filtering window is characteristic of the pooling layer. According to one mode of implementation, the second sliding window has a dimension N counted along the first direction, the first filtering comprising N−1 slides of the first sliding window along the first direction and, a first storage of N first sets of data in a first temporary memory.

By "first temporary memory" is meant, for example, a buffer memory (commonly referred to by the term "buffer").

Each slide of the first filtering window makes it possible to obtain a first set of output data. Each first set is stored on a row of the first temporary memory which comprises N rows, N representing the height of the second sliding window.

According to one mode of implementation, the initial set of data is stored in matrix fashion according to rows and columns, the succession of rows extending along the first direction, for example, the vertical direction, and the succession of columns extending along the second direction, for example, the horizontal direction, each individual row extending along the second direction and each individual column extending along the first direction.

According to one mode of implementation, the first sliding window slides by strides along the first direction and at each stride, traverses the corresponding row. The stride can be arbitrary. Thus the first sliding window can slide row by row or else can skip rows.

According to one mode of implementation, the second filtering comprises slides of the second sliding window, along the second direction, on the first temporary memory storing the N first sets of data, each slide producing a second set of data, the second filtering comprising a second storage of M second sets of data in a second temporary memory.

By "second temporary memory" is meant, for example, a buffer memory (commonly referred to by the term "buffer").

Stated otherwise, each slide of the second sliding window on the first temporary memory comprising N first sets of data produces a second set of data.

Each second set of data represents the output data of the pooling layer.

According to one mode of implementation, the first storage comprises a circular filling of the first temporary memory by the first set of data produced at each slide of the first sliding window.

The oldest first set of data is replaced with the most recent first set of data.

According to one mode of implementation, the second filtering is performed after a number of circular fillings of the first temporary memory.

For example, it is possible to perform the second filtering after two successive slides of the first sliding window which has just produced two new first sets of data.

According to one mode of implementation, the first filtering and the second filtering follow one another until the processing of all the data of the initial set.

According to one mode of implementation, the neural network comprises at least one non-linear layer between the at least one convolution layer and the at least one pooling layer.

According to one mode of implementation, the neural network is defined by parameters, implemented in floating point or in fixed point.

By "floating point" is meant a real number represented by a sign, a mantissa and an exponent.

By "fixed point" is meant a number which possesses a fixed number of bits after the point.

By "parameters" is meant, for example, the weights of the neural network and the data defining each layer of the network.

According to another aspect, there is proposed a device comprising an initial memory intended to store an initial set of data along first and second orthogonal directions, and a first memory intended to store parameters defining a convolutional neural network configured to process the initial set of data, the network comprising at least one convolution layer followed by at least one pooling layer, and a computation unit, for example, a microprocessor, configured to perform the operations of the various layers of the neural network, the at least one convolution layer being configured to perform a first filtering of the initial set of the data using a first sliding window along the first direction so as to produce a first set of data at each slide, and the at least one pooling layer being configured to perform a second filtering of the first sets of data using a second sliding window along the second direction.

According to one embodiment, the second sliding window has a dimension N counted along the first direction, and in which the device comprises a processor configured to limit the slides of the first sliding window to N−1 slides along the first direction, the device furthermore comprising a first temporary memory configured to store N first sets of data.

According to one embodiment, the initial set of data is stored in matrix fashion according to rows and columns, the succession of rows extending along the first direction, and the succession of columns extending along the second direction, each individual row extending along the second direction and each individual column extending along the first direction.

According to one embodiment, the processor is configured to slide the first sliding window by strides along the first direction and to, at each stride, make the first sliding window traverse the corresponding row.

According to one embodiment, the processor is configured to slide the second window along the second direction on the first temporary memory storing the N first sets of data, so as to produce a second set of data at each slide, the device also comprising a second temporary memory configured to store M second sets of data.

According to one embodiment, the processor is configured to perform a circular filling of the first temporary memory with the first sets of data produced during the slides of the first sliding window.

According to one embodiment, the processor is configured to perform the second filtering once the first memory has performed a number of circular fillings.

According to one embodiment, the processor is configured to perform the first and second filterings successively until the processing of all the data of the initial set.

According to one embodiment, the neural network comprises at least one non-linear layer between the at least one convolution layer and the at least one pooling layer.

According to one embodiment, the parameters of the neural network are implemented in floating point or in fixed precision.

There is also proposed a microcontroller comprising the device.

BRIEF DESCRIPTION OF THE DRAWINGS

Other advantages and characteristics of the invention will become apparent on reading the detailed description of the wholly non-limiting modes of implementation and embodiments, and the appended drawings in which.

DETAILED DESCRIPTION OF ILLUSTRATIVE EMBODIMENTS

Figure 1:
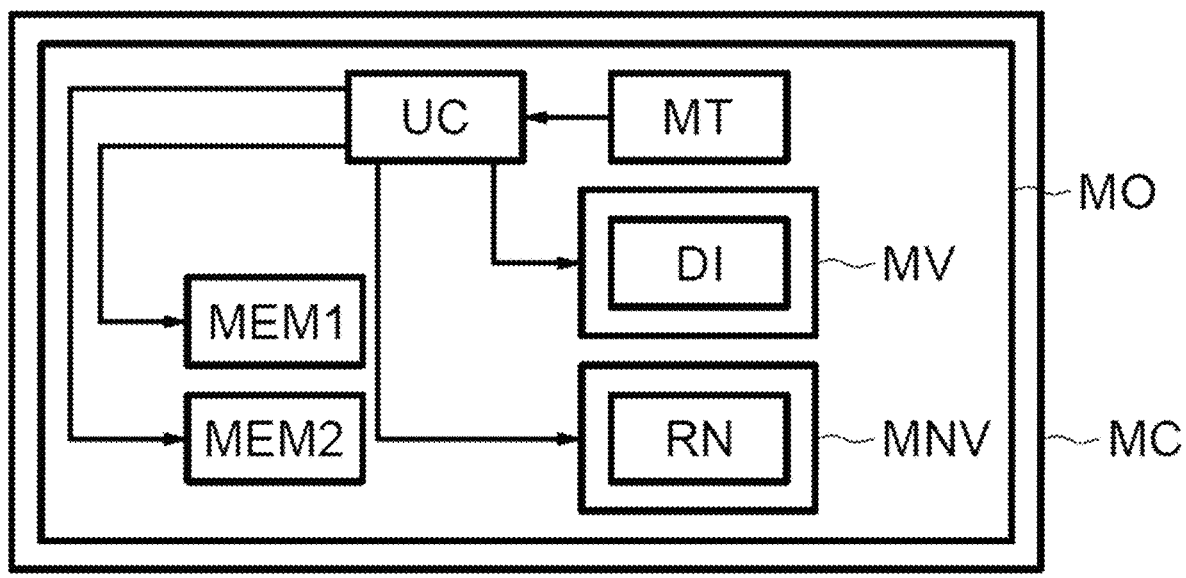
FIG. 1 schematically illustrates an embodiment of the invention.

In FIG. 1, the reference MC designates an electronic object, for example, a microcontroller, a code generator or any other object that can contain a hardware or embedded software architecture.

The object MC comprises a device MO, for example, a module comprising an initial memory MV, for example, a RAM (for "Random Access Memory") volatile memory configured to store an initial set of data DI.

The device MO also comprises a non-volatile memory MNV, for example, a ROM (for "Read-Only Memory") memory intended to store the parameters defining a convolutional neural network RN.

By "parameters" is meant the weights of the neural network and the data defining each layer of the neural network.

The parameters can be implemented in fixed point or in floating point.

By "floating point" is meant a real number represented by a sign, a mantissa and an exponent.

By "fixed point" is meant a number which possesses a fixed number of bits after the point.

This configuration makes it possible to process in a specific manner the data DI stored in the initial memory MV and to deliver output data.

Accordingly, the device MO comprises a computation unit UC, for example, a microprocessor configured to perform the operations defined by each layer of the neural network RN.

The computation unit UC is consequently coupled to the non-volatile memory MNV so as to extract the parameters of each layer of the neural network RN. It is also coupled to the volatile memory MV so as to extract the initial set of data DI on which the processing will be performed.

The device MO comprises a first temporary memory MEM1 and a second temporary memory MEM2.

By "temporary" is meant a buffer memory (commonly referred to by the term "buffer").

The first and the second temporary memories MEM1 and MEM2 are coupled to the computation unit UC.

The first and the second temporary memories MEM1 and MEM2 are configured to store data delivered by the computation unit UC.

The device MO comprises a processor MT coupled to the computation unit UC and configured to control the number of operations to be performed for each layer and consequently, control the storage of the data delivered by the computation unit UC.

The processor can be embodied, for example, by a software module within the microprocessor and/or by specific logic circuits.

Figure 2:
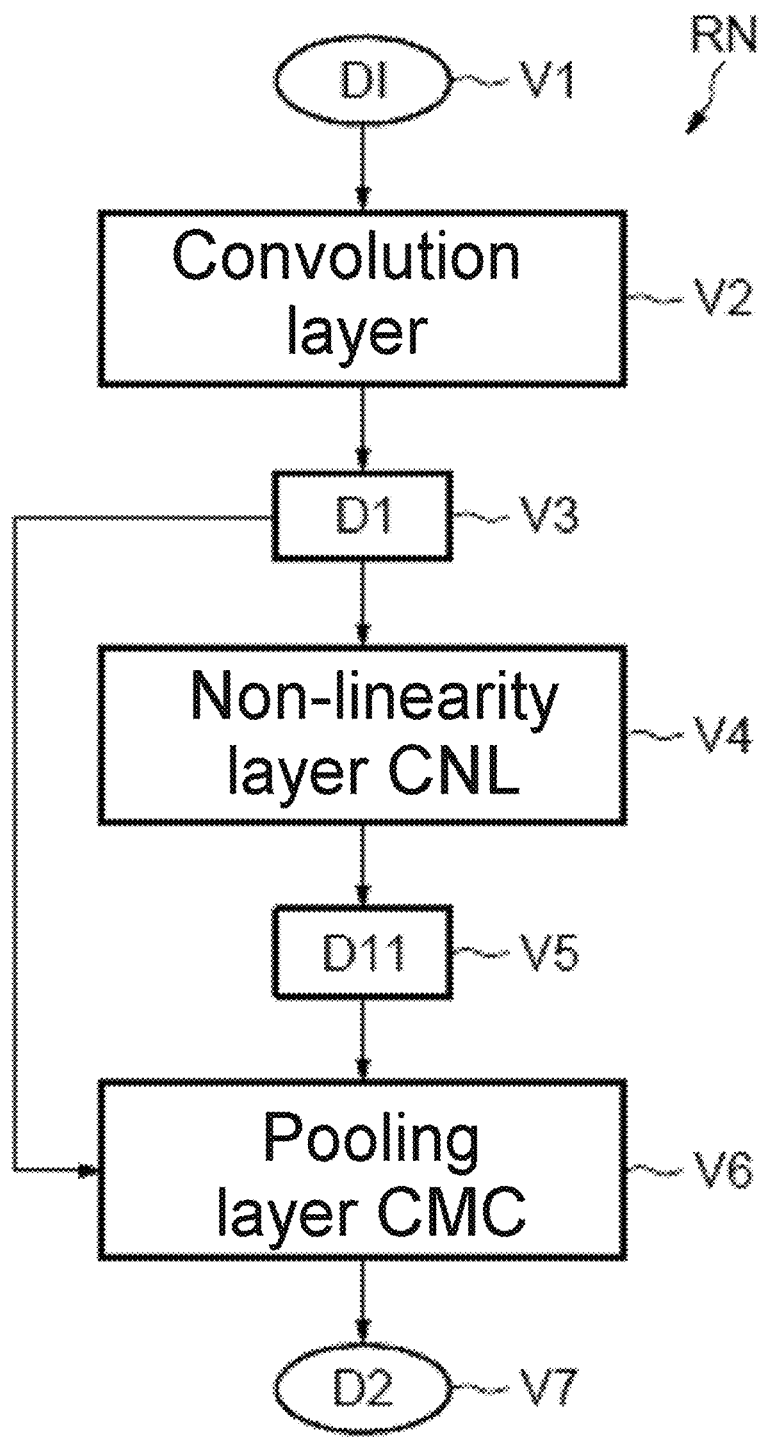
FIG. 2 schematically illustrates a mode of implementation and embodiment of the invention, FIG. 3 schematically illustrates a mode of implementation and embodiment of the invention, FIG. 4A schematically illustrates a mode of implementation and embodiment of the invention, FIG. 4B schematically illustrates a mode of implementation and embodiment of the invention, and FIG. 4C schematically illustrates a mode of implementation and embodiment of the invention.

FIG. 2 schematically illustrates the various steps of processing of the initial set of data DI by the layers of the neural network RN.

The neural network RN comprises at least one convolution layer CV followed by at least one pooling layer CMC.

The convolution layer CV makes it possible to tag the presence of a set of specific data in the initial set of data DI received in step V1. Accordingly, the convolution layer carries out a convolution filtering in step V2 using a first sliding window F1 illustrated in FIGS. 4A, 4B and 4C.

The first sliding window F1 makes it possible to compute the convolution product between the window and each portion of the initial set of data DI.

The initial set of data DI arises as a matrix having rows and columns, the succession of rows extending along a first direction and therefore vertically and the succession of columns extending along a second direction, that is to say horizontally.

The first sliding window F1 slides along the first direction and therefore vertically, while traversing, at each slide, a row of the initial set of data DI. Each slide produces a first set of data D1 in step V3.

By "slide" is meant here that the first sliding window F1 traverses each row of the initial set of data DI.

Each first set of data D1 is stored in the first temporary memory MEM1.

The neural network can comprise a non-linear layer CNL, which makes it possible to improve the relevance of the result. It takes as input in step V4 a first set of data D1 and produces an intermediate set of data D11 in step V5.

The intermediate sets of data D11 can be placed in an intermediate temporary memory.

The non-linear layer CNL being optional, the first sets of data D1 can be dispatched directly to the pooling layer CMC.

The pooling layer CMC therefore receives the first sets of data D1 to which a "pooling" operation is applied in step V6, which consists in reducing the size of the sets of data D1 while preserving their important characteristics.

Figure 4A:
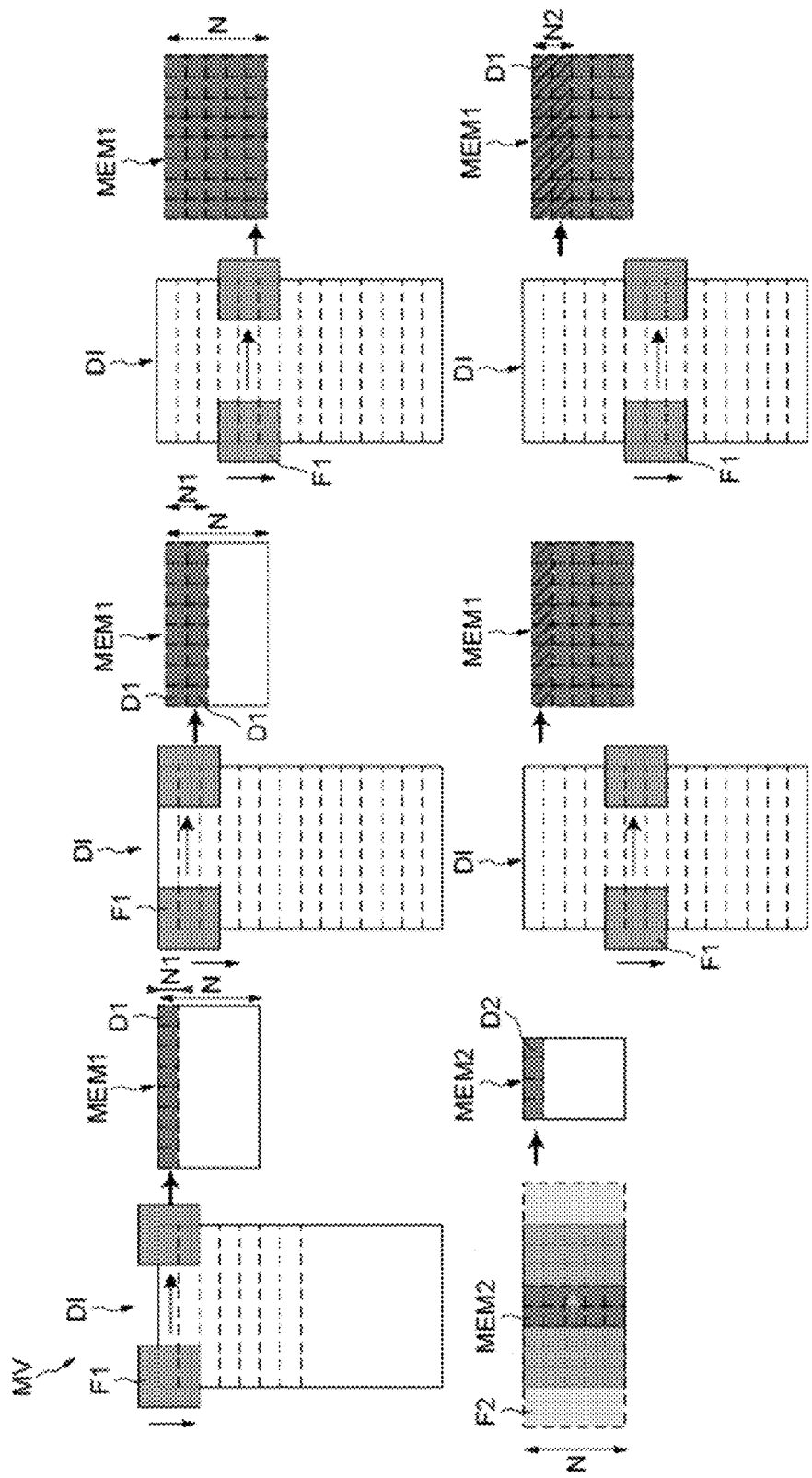
Figure 4B:
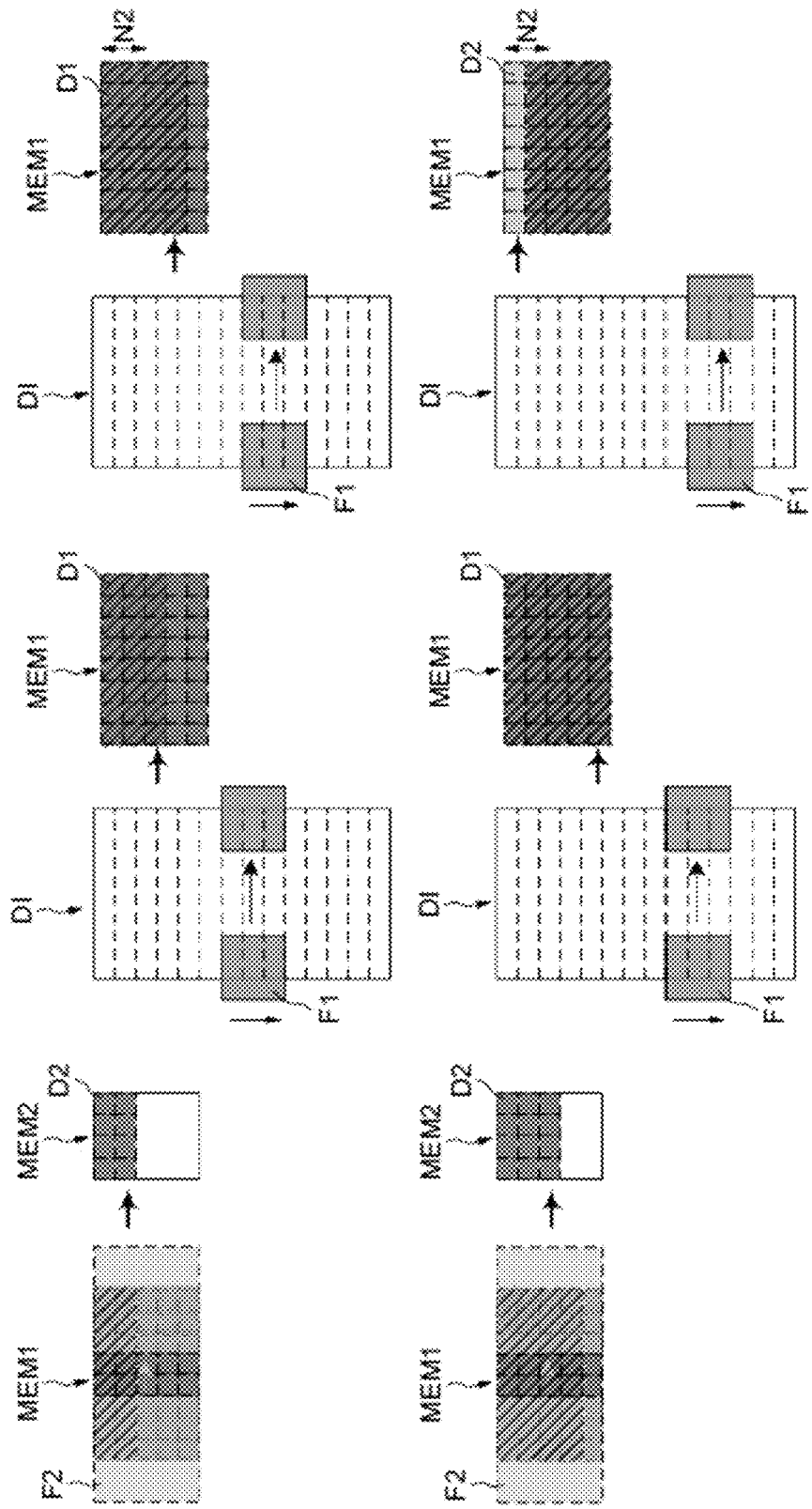
Figure 4C:
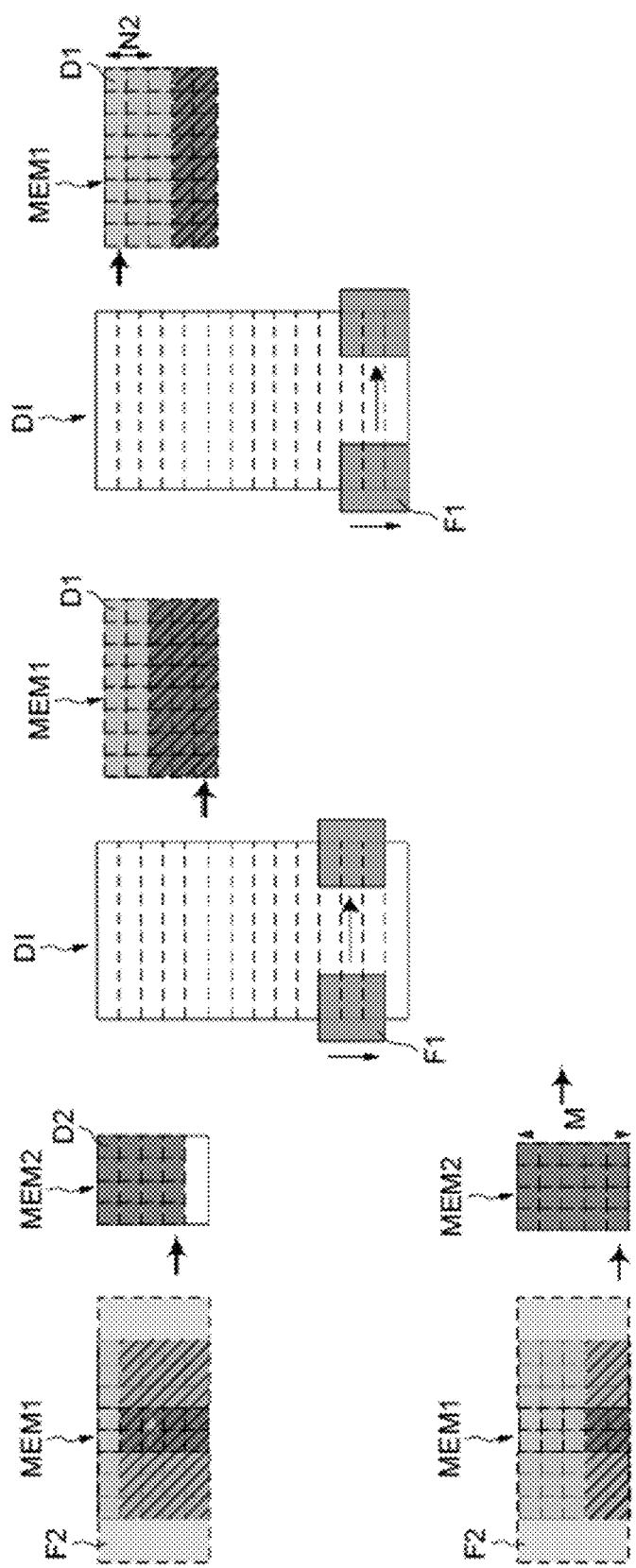

Accordingly, the pooling layer CMC uses a second sliding window F2 illustrated in FIGS. 4A, 4B and 4C.

The second sliding window F2 slides along the second direction and produces a first set of data D2 in step V7.

Each second set of data D2 is stored in the second temporary memory MEM2.

Figure 3:
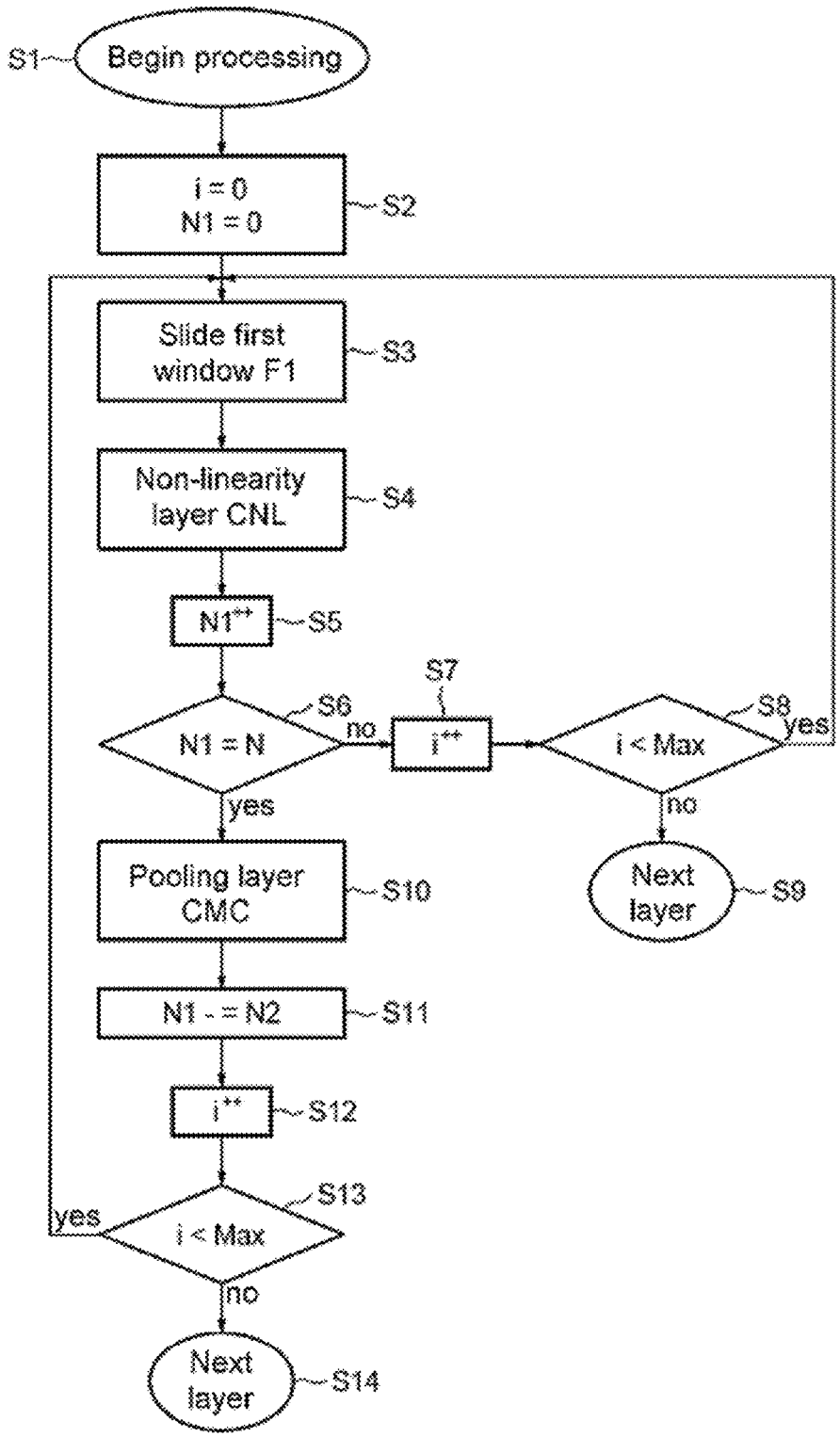

FIG. 3 schematically illustrates an algorithm implemented in the processor MT.

The algorithm allows the processor MT to control the number of operations to be performed for each layer and consequently, control the storage of the data delivered by the computation unit UC.

When the processor MT detects the presence of a convolution layer CV in step S1, they initialize in step S2 a variable i to 0 and a variable N1 also to 0.

The variable i represents an index traversing the list of the rows generated as output of the convolution layer.

The variable N1 represents the number of first sets D1 stored in the first temporary memory MEM1.

The first and the second temporary memory MEM1 and MEM2 are empty in step S2.

In step S3, the first sliding window F1 slides along the first direction and therefore vertically, while traversing at each slide a row of the initial set of data DI. Each slide produces a first set of data D1. The first set of data D1 can be dispatched to the non-linearity layer CNL in step S4 which produces an intermediate set of data D11. This step S4 is optional.

In step S5, the value of the variable N1 is incremented by 1 since a first set of data D1 has just been stored in the temporary memory MEM1.

In step S6, a first comparison is carried out between the variable N1 and a third variable N representative of the dimension of the second sliding window F2 and of the maximum number of first sets of data D1 that the first temporary memory MEM1 can contain.

If the value of the variable N1 is equal to the value N, this means that the first temporary memory MEM1 comprises N first sets of data D1. It can therefore no longer contain any more of them.

If the value of the variable N1 is less than the value N, this means that the first temporary memory MEM1 can store more first sets of data D1.

Given that in this example, only a first set of data D1 has been stored, the value of the variable N1 is less than the value N and therefore step S7 is passed to in which the value of the variable i is incremented by 1.

In step S8, a second comparison is carried out between the value of the variable i and a variable Max representative of the maximum number of rows generated as output of the convolution layer.

If the value of the variable i is greater than the value of the variable Max, this means that all the rows generated have been traversed. The processor MT passes to the following convolution layer CV if there remains any in step S9.

In the converse case, steps S3, S4 and S5 are repeated until the value of the variable N1 is equal to the value of the variable N.

We thereafter pass to step S10 in which the pooling layer CMC uses the second filtering window F2 along the second direction on the N first sets of data D1 contained in the first temporary memory MEM1 and produces a second set of data D2.

In step S11, a defined number N2, which represents the number of slides of the first window F1 to be carried out before performing a second filtering, is subtracted from the value of the variable N1.

The value of the variable N1 is equal to N1-N2.

In step S12, the value of the variable i is incremented by 1 and in step S13 we verify whether the value of the variable i is less than the value of the variable Max.

If no, we pass in step S14 to the following convolution layer CV which will use another first filtering window F1 and will traverse the initial set of data DI.

If yes, we continue to filter the initial set of data D1 with the first filtering window N2 times, that is to say until N1 is equal to N.

The N2 first sets of data D1 overwrite the oldest first sets of data D1 in the first temporary memory MEM1. The computation unit UC therefore performs a circular filling.

The second sliding window F2 carries out a slide on the first temporary memory MEM1 comprising the two new first sets D1 and produces a second set D2.

This algorithm is repeated until the processing of all the rows of the initial set of data DI.

FIGS. 4A, 4B and 4C schematically illustrate the implementation of the algorithm.

In FIG. 4A, the first sliding window F1 slides a first time over the first row of the initial set of data DI and produces a first set of data D1 which will be stored in the first temporary memory MEM1. N1 is now equal to 1.

The first window F1 slides a second time over the second row of the initial set of data DI and produces a first set of data D1 which will be stored in the first temporary memory MEM1. N2 is now equal to 2.

The sliding is repeated until N1 is equal to N here 5. N represents the height of the second sliding window.

The first temporary memory therefore contains N first sets of data D1.

The second sliding window F2 slides along the second direction on the first temporary memory MEM1 and produces a second set of data D2 which will be stored in the second temporary memory MEM2.

N2 is subtracted from N1 which is here equal to 2. N1 is therefore equal to 3.

The first sliding window F1 slides a sixth time over the sixth row of the initial set of data DI and produces a first set of data D1. N1 equals 4.

The first set of data D1 overwrites the oldest first set of data D1.

The first window F1 slides a seventh time over the seventh row of the initial set of data DI and produces a first set of data D1. N1 equals 5.

The first set of data D1 overwrites the oldest first set of data D1.

It should be noted that the first window F1 may, for example, not slide over each row of the initial set of data DI. The first window F1 may have a slide stride.

In FIG. 4B, the second sliding window F2 slides over the first temporary memory MEM1 containing the two new first sets of data D1 and produces a second set of data D2 which will be stored in the second temporary memory MEM2.

N2 is subtracted from N1 which is here equal to 2. N1 is therefore equal to 3.

The same steps in FIGS. 4B and 4C are repeated until there are no longer any rows to be processed in the initial set of data DI.

What is claimed is:

1. A method of processing an initial set of data through a convolutional neural network that includes a convolution layer followed by a pooling layer, the initial set being stored in an initial memory along first and second orthogonal directions, the method comprising:
   performing a first filtering of the initial set of data by the convolution layer using a first sliding window along the first direction, each slide of the first window producing a first set of data; and
   performing a second filtering of the first sets of data by the pooling layer using a second sliding window along the second direction.

2. The method according to claim 1, wherein the convolution layer comprises a plurality of convolution layers and the pooling layer comprises a plurality of pooling layers.

3. The method according to claim 1, wherein the initial set of data is stored in matrix fashion according to rows and columns, the rows extending along the first direction and the columns extending along the second direction, each individual row extending along the second direction and each individual column extending along the first direction.

4. The method according to claim 3, wherein the first sliding window slides by strides along the first direction and, at each stride, traverses the corresponding row.

5. The method according to claim 1, wherein the first filtering and the second filtering follow one another until all the data of the initial set is processed.

6. The method according to claim 1, wherein the neural network comprises a non-linear layer between the convolution layer and the pooling layer.

7. The method according to claim 1, wherein the neural network is defined by parameters implemented in floating point or in fixed precision.

8. A method of processing an initial set of data through a convolutional neural network that includes a convolution layer followed by a pooling layer, the initial set being stored in an initial memory along first and second orthogonal directions, the method comprising:
   performing a first filtering of the initial set of data by the convolution layer using a first sliding window along the first direction, each slide of the first window producing a first set of data;

performing a second filtering of the first sets of data by the pooling layer using a second sliding window along the second direction, wherein the second sliding window has a dimension N counted along the first direction, the first filtering comprising N−1 slides of the first sliding window along the first direction; and storing N first sets of data in a first temporary memory.

9. The method according to claim 8, wherein the second filtering comprises slides of the second sliding window, along the second direction, on the first temporary memory storing the N first sets of data, each slide producing a second set of data, the second filtering comprising a second storage of M second sets of data in a second temporary memory.

10. The method according to claim 8, wherein the storing comprises a circular filling of the first temporary memory by the first set of data produced at each slide of the first sliding window.

11. The method according to claim 10, wherein the second filtering is performed after a number of circular fillings of the first memory.

12. A device comprising:
an initial memory configured to store an initial set of data along first and second orthogonal directions;
a first memory configured to store parameters defining a convolutional neural network configured to process the initial set of data, the network comprising a convolution layer followed by a pooling layer; and
a computation unit configured to perform the operations of the layers of the neural network, the convolution layer being configured to perform a first filtering of the initial set of the data using a first sliding window along the first direction so as to produce a first set of data at each slide, and the pooling layer being configured to perform a second filtering of the first sets of data using a second sliding window along the second direction.

13. The device according to claim 12, wherein the second sliding window has a dimension N counted along the first direction, the device comprising a processor configured to limit the slides of the first sliding window to N−1 slides along the first direction, the device further comprising a first temporary memory configured to store N first sets of data.

14. The device according to claim 13, wherein the initial set of data is stored in matrix fashion according to rows and columns, the rows extending along the first direction and the columns extending along the second direction, each individual row extending along the second direction and each individual column extending along the first direction.

15. The device according to claim 14, wherein the processor is configured to slide the first sliding window by strides along the first direction and to, at each stride, make the first sliding window traverse the corresponding row.

16. The device according to claim 13, wherein processor configured to slide the second sliding window along the second direction on the first temporary memory storing the N first sets of data, so as to produce a second set of data at each slide, the device further comprising a second temporary memory configured to store M second sets of data.

17. The device according to claim 13, wherein the processor is configured to perform a circular filling of the first temporary memory with the first sets of data produced during the slides of the first sliding window.

18. The device according to claim 17, wherein the processor is configured to perform the second filtering once the first memory has performed a number of circular fillings.

19. The device according to claim 13, wherein processor is configured to perform the first filtering and the second filtering successively until the processing of all the data of the initial set.

20. The device according to claim 12, wherein the neural network comprises a non-linear layer between the convolution layer and the pooling layer.

21. The device according to claim 12, wherein the neural network is defined by parameters implemented in floating point or in fixed precision.

22. The device according to claim 12, wherein the device is a microcontroller.

* * * * *